United States Patent
Talios et al.

(10) Patent No.: US 9,771,017 B1
(45) Date of Patent: Sep. 26, 2017

(54) ELECTRIC TOY WITH ILLUMINATED HANDLEBAR

(71) Applicant: Dynacraft BSC, Inc., American Canyon, CA (US)

(72) Inventors: Bill Talios, Petaluma, CA (US); John Bisges, Buford, GA (US); David Castrucci, Napa, CA (US)

(73) Assignee: DYNACRAFT BSC, INC., American Canyon, CA (US)

( * ) Notice: Subject to any disclaimer, the term of this patent is extended or adjusted under 35 U.S.C. 154(b) by 0 days.

(21) Appl. No.: 15/233,570

(22) Filed: Aug. 10, 2016

(51) Int. Cl.
| | |
|---|---|
| *B60K 1/00* | (2006.01) |
| *B60Q 1/04* | (2006.01) |
| *A63H 17/28* | (2006.01) |
| *B60L 1/14* | (2006.01) |
| *B60L 11/18* | (2006.01) |
| *B62D 1/02* | (2006.01) |

(52) U.S. Cl.
CPC ........... *B60Q 1/0408* (2013.01); *A63H 17/28* (2013.01); *B60L 1/14* (2013.01); *B60L 11/1809* (2013.01); *B62D 1/02* (2013.01); *B60L 2200/20* (2013.01)

(58) Field of Classification Search
CPC .......... B60Q 1/0408; B60Q 1/00; B60Q 1/02; B60Q 1/26; B60Q 1/2619; B60Q 1/14; B60Q 1/1446; B60Q 1/1453; B60Q 1/16; B60Q 1/24; B60Q 1/2661; B60L 11/1809; B60L 1/14; B60L 1/16; B60L 1/00; B60L 2200/20; B62D 1/02; B62D 1/00; A63H 17/28; A63H 17/00; A63H 17/16; A63H 17/36; A63H 17/38; A63H 17/18; A63H 17/21
See application file for complete search history.

(56) References Cited

U.S. PATENT DOCUMENTS

| | | | | |
|---|---|---|---|---|
| 4,779,169 A | * | 10/1988 | Cruze | B62J 6/005 340/432 |
| 4,901,209 A | * | 2/1990 | Nitz | B62K 19/16 280/281.1 |
| 5,008,782 A | * | 4/1991 | Murray | B62J 6/00 362/249.01 |

(Continued)

OTHER PUBLICATIONS

Walmart, "16" Huffy STAR WARS Episode VII Lightsaber Bike, Available on line as early as Jul. 17, 2016 <http://www.walmart.com/ip/16-Huffy-STAR-WARS-Episode-VII-Lightsaber-Bike/46269931?action=product_interest&action_type=title&item_id=46269931&placement_id=irs-106-m2&strategy=CBTV&visitor_id=cMIz6lhjMnecdi_L3rAB_g&category=&client_guid&customer_id_enc=&config_id=2&parent_item_id=46269931&parent_anchor_item_id=46269931&guid&bucket_id=irsbucketdefault&beacon_version=1.0.1&findingMethod=p13n>.

*Primary Examiner* — James M Dolak
(74) *Attorney, Agent, or Firm* — Michael Best & Friedrich LLP

(57) ABSTRACT

An electric toy vehicle according to the present disclosure comprises an illuminated handlebar including a hollow tube having a first end and a second end. The illuminated handlebar also includes a light disposed within the hollow tube and between the first end and the second end of the tube and a switch electrically coupled to the light and disposed at one of the first end and the second end of the hollow tube. The toy vehicle further includes a motor electrically coupled to the switch and a battery electrically coupled to the motor, the light and the switch. The light is visible within the hollow tube when the switch is activated and the motor powers the electric toy vehicle.

11 Claims, 4 Drawing Sheets

(56) References Cited

U.S. PATENT DOCUMENTS

| | | | | |
|---|---|---|---|---|
| 5,247,431 A * | 9/1993 | Liu | ................ | B62J 6/005 |
| | | | | 362/474 |
| 5,765,936 A * | 6/1998 | Walton | ................ | B62J 6/00 |
| | | | | 362/183 |
| 5,842,714 A * | 12/1998 | Spector | ................ | A42B 3/0433 |
| | | | | 280/288.4 |
| 6,336,736 B1 * | 1/2002 | Edmond | ................ | B62J 6/00 |
| | | | | 362/473 |
| 6,779,913 B2 * | 8/2004 | Niezrecki | ................ | B62J 6/20 |
| | | | | 362/473 |
| 6,994,179 B2 * | 2/2006 | Huntsberger | ................ | B60L 11/1805 |
| | | | | 180/220 |
| 7,490,684 B2 * | 2/2009 | Seymour | ................ | B60L 8/003 |
| | | | | 180/65.1 |
| 7,798,685 B2 * | 9/2010 | Edmond | ................ | B60Q 1/2661 |
| | | | | 362/217.12 |
| 7,891,849 B2 * | 2/2011 | Campbell | ................ | B60Q 1/2661 |
| | | | | 362/473 |
| 7,997,775 B2 * | 8/2011 | Hurwitz | ................ | B60Q 1/2615 |
| | | | | 362/464 |
| 9,561,734 B2 * | 2/2017 | Watarai | ................ | B60L 7/12 |
| 9,566,533 B2 * | 2/2017 | Bruder | ................ | A63H 17/12 |
| 9,579,585 B2 * | 2/2017 | Silverglate | ................ | A63H 17/38 |
| 9,598,003 B2 * | 3/2017 | Dingman | ................ | B60Q 1/2665 |
| 9,616,807 B2 * | 4/2017 | Miura | ................ | B60Q 1/2661 |
| 9,638,387 B2 * | 5/2017 | Hollingworth | ................ | F21S 48/2243 |
| 2010/0053984 A1 | 3/2010 | Wang | | |

* cited by examiner

ELECTRIC TOY WITH ILLUMINATED HANDLEBAR

BACKGROUND

Toy vehicles have been a popular kid's toy for a number of years. One type of toy vehicle is a battery powered ride-on toy vehicle.

Figure 1:
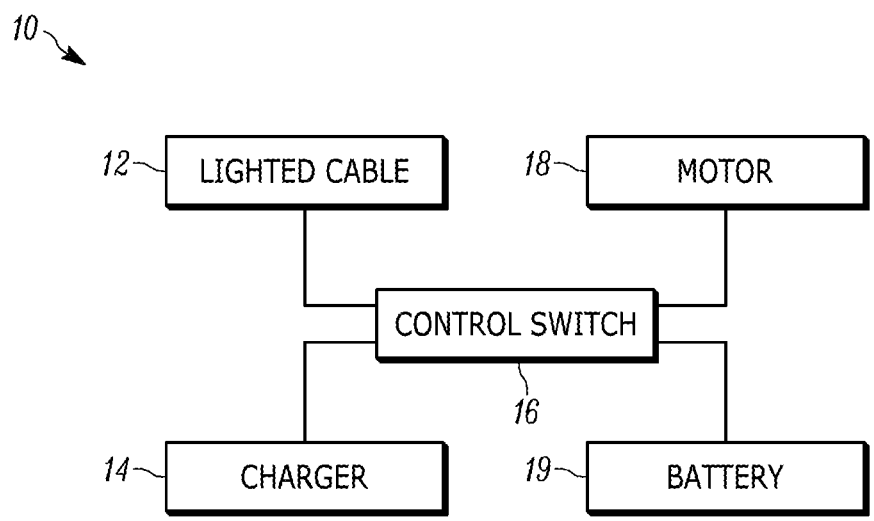
FIG. 1 is a block diagram of an electric toy vehicle with an illuminated handlebar in accordance with some embodiments.

Elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

SUMMARY

One exemplary embodiment provides an electric toy vehicle comprising an illuminated handlebar including a hollow tube having a first end and a second end. The illuminated handlebar also includes a light source disposed within the hollow tube and between the first end and the second end of the tube and a switch electrically coupled to the light source and disposed at one of the first end and the second end of the hollow tube. The toy vehicle further includes a motor electrically coupled to the switch and a battery electrically coupled to the motor, the light source and the switch. The light source is visible within the hollow tube when the switch is activated and the motor powers the electric toy vehicle.

DETAILED DESCRIPTION

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways.

FIG. 1 is a block diagram for the electronic components of an electric toy vehicle 10 having an illuminated handlebar in accordance with some embodiments. The electric toy vehicle 10 includes a lighted cable 12, a charger 14, a control switch 16, a motor 18 and a battery 19. The lighted cable 12, the charger 14, the motor 18 and the battery 19 are electrically coupled to the control switch 16. In one example, the lighted cable 12 includes a string of light emitting diodes (LEDs) that are electrically coupled to each other. In other examples, the lighted cable 12 includes a light emitting diode strip. In some embodiments, the string of light emitting diodes of the lighted cable 12 may be of different colors. The control switch 16 can be either set to an "ON" position or an "OFF" position. In one embodiment, the control switch 16 when engaged allows power from the battery 19 to flow to the motor 18 and the lighted cable 12. In some embodiments, the lighted cable 12 and the motor 18 may be simultaneously activated when the control switch is switched to the "ON" position.

The motor 18 powers the electric toy vehicle 10 when it receives power from the battery 19. In some embodiments, the motor 18 may be configured to accelerate the electric toy vehicle 10 based on the amount of time the control switch 16 has been activated. In other embodiments, the motor 18 is configured to accelerate the electric toy vehicle 10 to a predetermined velocity and once the predetermined velocity has been achieved the motor 18 operates at a constant speed. In an example, the motor 18 runs at a speed of 1300 revolutions per minute (rpm). In an example, the motor 18 draws electric power from the battery 19, which has a potential difference of 6 volts.

Figure 2:
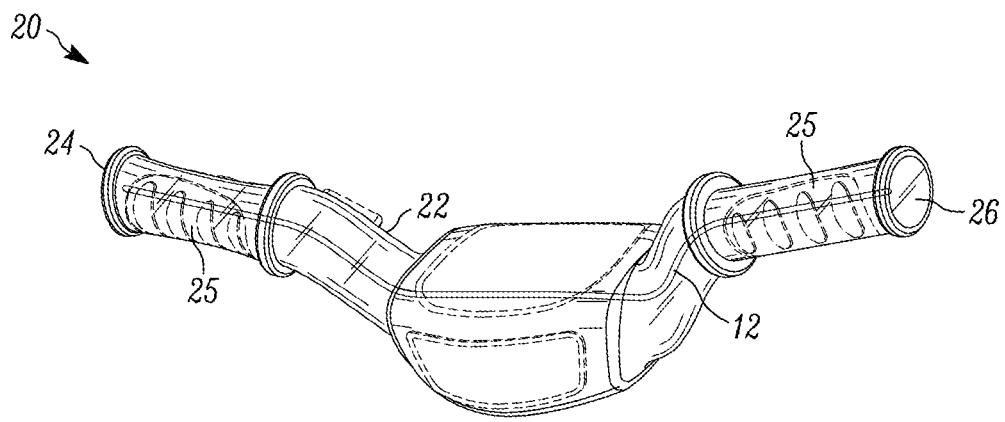
FIG. 2 is a perspective view of the illuminated handlebar in accordance with some embodiments.
Figure 3:
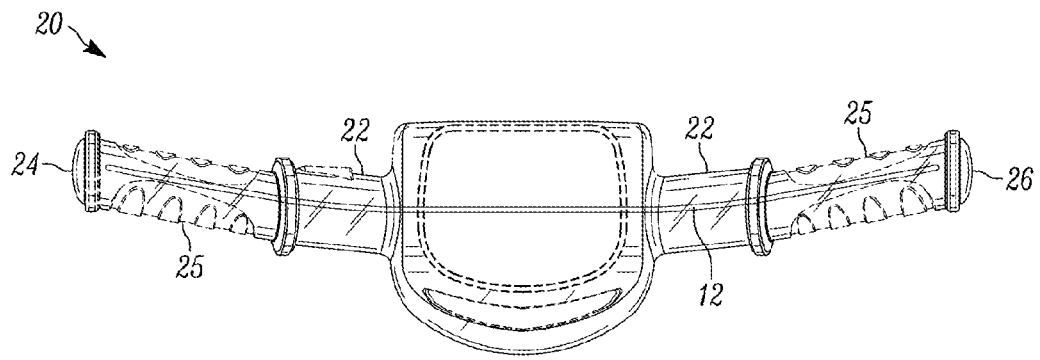
FIG. 3 is a top view of the illuminated handlebar in FIG. 2 in accordance with some embodiments.

As shown in FIG. 2 and FIG. 3 the illuminated handlebar 20 includes a hollow tube 22 having a first end 24 and a second end 26. The illuminated handle bar 20 also includes an internally located lighted cable 12 disposed within the hollow tube 22. In some embodiments, the hollow tube 22 includes a translucent tube made up of a translucent material capable of allowing light to propagate through the walls of the tube and make the lighted cable 12 visible when powered up to the rider and others viewing the vehicle. In other embodiments, the hollow tube 22 includes a transparent tube made up of a material that is substantially transparent. In some embodiments, the illuminated handlebar 20 may include a plurality of grips 25 disposed on opposite ends of the hollow tube 22 along the side surfaces of ends 24, 26. In one embodiment, the hollow tube 22 has the same outside diameter along the length of hollow tube 22, but in other embodiments, the hollow tube 22 diameter may vary along substantially the length of hollow tube 22. In some embodiments, the hollow tube 22 may have varying circumference for the hollow portion inside the hollow tube 22 along the length of hollow tube 22. The lighted cable 12 is disposed within the hollow tube 22 such that when it receives power from the battery 19, it will illuminate and can be seen through the hollow tube 22.

Figure 4:
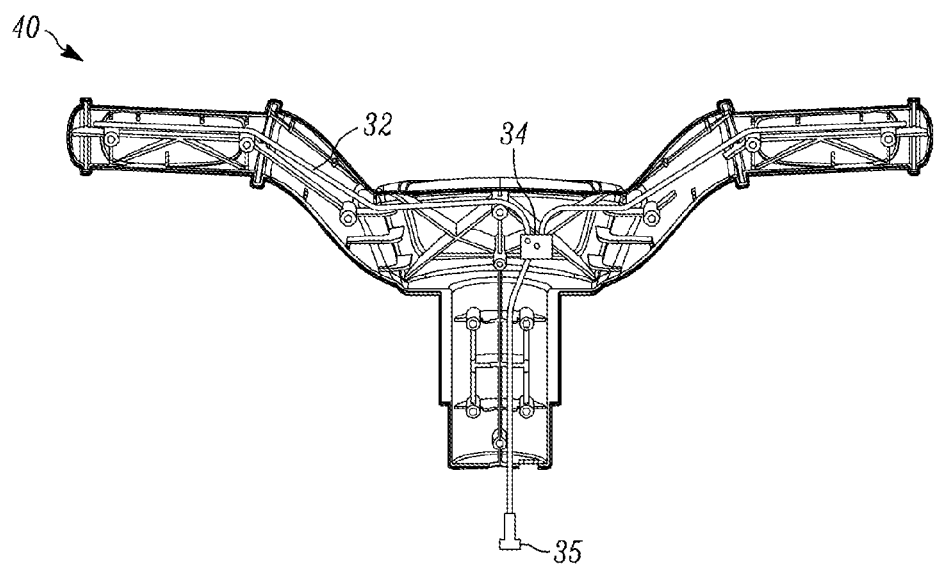
FIG. 4 shows an illuminated handlebar with a lighted cable connected to a power connector, in accordance with some embodiments.

FIG. 4 shows an illuminated handlebar 40 with a lighted cable connected to a power connector 35, in accordance with some embodiments. In some embodiments, the illuminated handlebar 40 includes an light emitting diode strip 32, a light emitting diode controller 34 and a power connector 35 disposed within the tube 22. The power connector 35 is configured to electrically couple the lighted cable 12 to the battery. The light emitting diode strip 32 is electrically coupled to the light emitting diode controller 34 and the light emitting diode controller 34 is electrically coupled to the power connector 35. The light emitting diode controller 34 is configured to control the power received from a battery.

In some embodiments, the light emitting diode controller 34 is configured to control the flashing of the light emitting diode strip 32. In an example, the light emitting diode controller 34 is configured to vary the amount of time the light emitting diode strip 32 is turned on and turned off. In another example, the light emitting diode controller 34 is configured to vary the sequence of flashing of light individual emitting diodes within light emitting diode strip 32. In yet another example, the light emitting diode controller 34 is configured to vary the brightness of individual light emitting diodes within light emitting diode strip 32.

Figure 5:
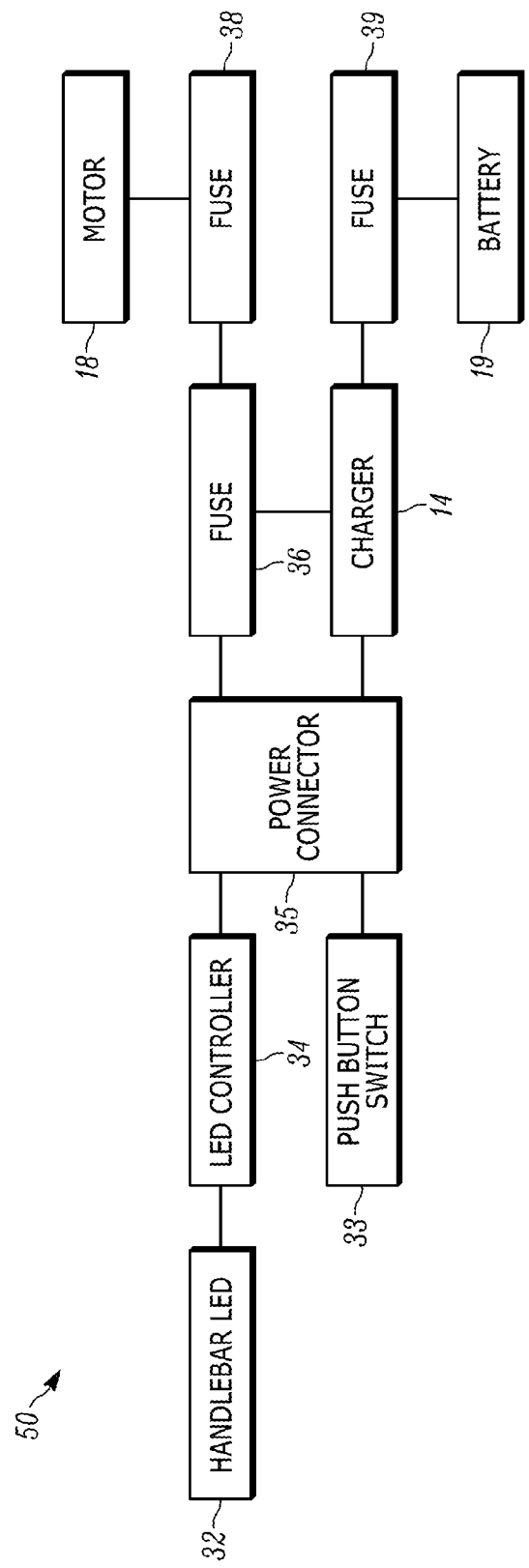
FIG. 5 is a circuit diagram of the electric toy vehicle having the illuminated handlebar in accordance with some embodiments.
Figure 6:
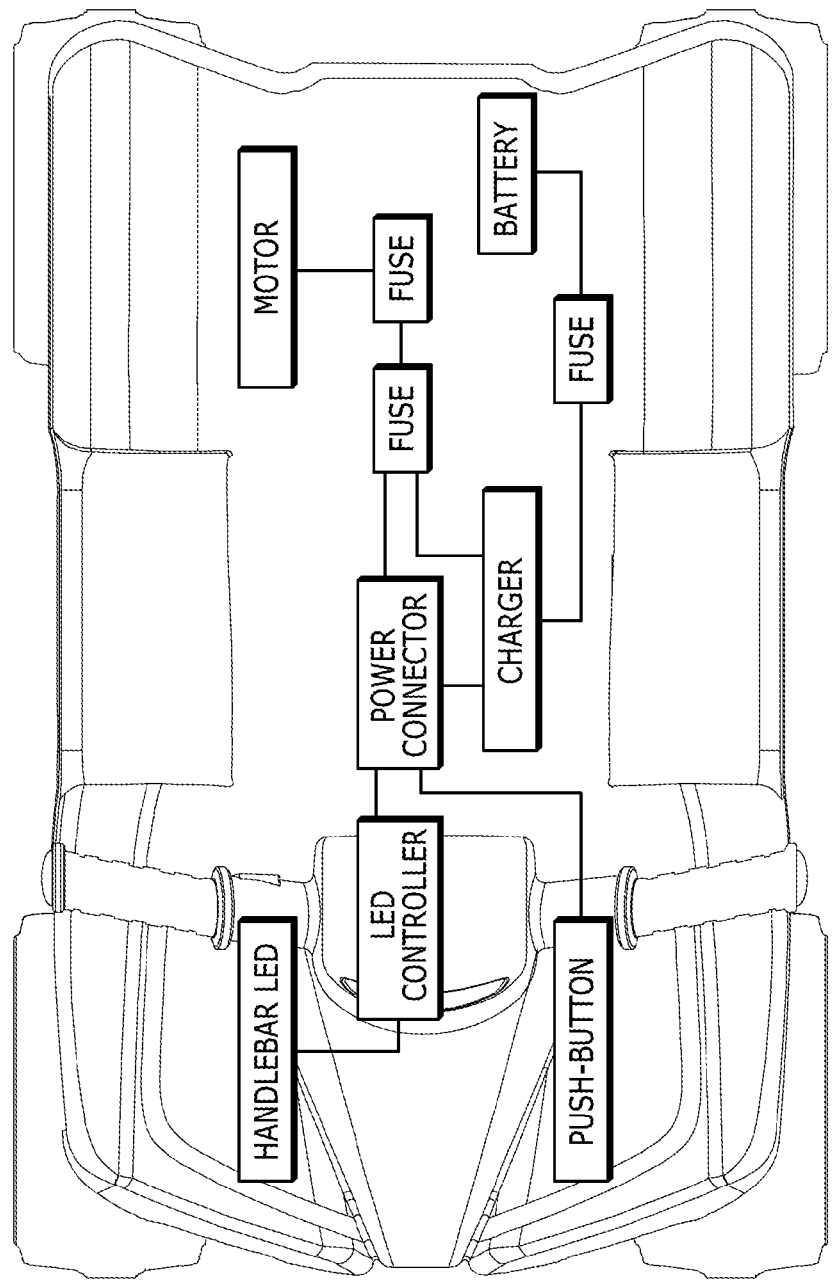
FIG. 6 shows a top view of the electric toy vehicle of FIG. 1 with an illuminated handlebar in accordance with some embodiments.

FIG. 5 is a circuit diagram 50 of the electric toy vehicle 10 having the illuminated handlebar 20 in accordance with some embodiments. The circuit diagram 40 includes a light emitting diode strip 32, a light emitting diode controller 34, a power connector 35, fuses 36, 38, and 39, a switch 33, a charger 14, a motor 18 and a battery 19 coupled to each other to form an electric circuit. In an example, switch 33 includes a push button device that closes the electric circuit when pushed down and opens the electric circuit when released. The circuit diagram 40 shown in FIG. 4 includes a handlebar light emitting diode 32 electrically coupled to the light emitting diode controller 34. The light emitting diode controller 34 is electrically coupled to fuse 36. The fuse 36 is electrically coupled to charger 14 and fuse 38. The fuse 38 is electrically coupled to motor 18. The switch 33 is electrically coupled to charger 14. The charger 14 is electrically coupled to the fuse 39 and the fuse 39 is electrically coupled to the battery 19. In some embodiments, the charger 14 is configured to charge the battery 19 when the battery 19 falls below a particular level of charge. The light emitting diode controller 34 is configured to control the power the light emitting diode strip 32 receives from the battery 19. The fuse 36, 38, and 39 protects the various electrical components in the circuit diagram 40 from receiving excess power. In an example, the fuse 36 includes a 3 Ampere blown fuse. In an example, the fuse 38 includes a resettable 5 Ampere fuse. In an example, fuse 39 includes a 25 Ampere blown fuse.

In operation, when the switch 33 is activated, it closes an electrical circuit between the battery 19, the light emitting diode strip 32, and the motor 18, thereby activating the LED 32 and motor 18. The LED 32 illuminates and the motor 18 powers the electric toy vehicle 10. In some embodiments, the lighted cable 12 emits light through the tube when the switch 33 is activated. In one embodiment, the light emitting diode strip 32 is a string of light emitting diodes in the form of a cable that is configured to illuminate when powered by the battery 19. In other embodiments, the light emitting diode strip 32 may be a number of light emitting diodes electrically coupled to each other in series and disposed within the tube 22 of the illuminated handlebar 20. In some embodiments the light emitting diode strip 32 may be a number of light emitting diodes electrically coupled to each other in parallel and disposed within the tube 22 of the illuminated handlebar 20.

What is claimed is:

1. An electric toy vehicle comprising:
   an illuminated handlebar including,
      a hollow tube having a first end and a second end,
      a light disposed within the hollow tube and between the first end and the second end of the tube, and
      a switch electrically coupled to the light and disposed between the first end and the second end of the hollow tube, wherein the light is visible within the hollow tube when the switch is turned on;
   a motor electrically coupled to the switch, the motor configured to power the electric toy vehicle when the switch is turned on;
   a battery electrically coupled to the motor, the light and the switch;
   a light controller configured to control the flow of electric power from the battery to the light; and
   wherein the electric toy vehicle is configured so that the light and the motor are simultaneously activated when the switch is turned on.

2. The electric toy vehicle of claim 1, wherein the light comprises a plurality of light emitting diodes.

3. The electric toy vehicle of claim 1, further comprising:
   a charger configured to charge the battery.

4. The electric toy vehicle of claim 1, wherein the switch is a push button device configured to power the light and the motor simultaneously.

5. The electric toy vehicle of claim 1, further comprising:
   wherein the light controller is configured to control electric power to a lighted cable.

6. The electric toy vehicle of claim 1, wherein the illuminated handlebar further comprises:
   a plurality of grips disposed on opposite ends of the tube.

7. The electric toy vehicle of claim 1, wherein the hollow tube includes a translucent tube.

8. The electric toy vehicle of claim 1, wherein the hollow tube includes a transparent tube.

9. The electric toy vehicle of claim 1, further comprising:
   a power connector disposed within the hollow tube, wherein the power connector is configured to electrically couple the light to the battery.

10. The electric toy vehicle of claim 1 wherein the vehicle is a ride-on electric toy.

11. The electric toy vehicle of claim 1, wherein the light includes a lighted cable.

* * * * *